US011606803B2

(12) United States Patent
Yu et al.

(10) Patent No.: US 11,606,803 B2
(45) Date of Patent: Mar. 14, 2023

(54) RESOURCE ALLOCATION AND SCHEDULING USING A BUFFER STATUS REPORT (BSR)

(71) Applicant: HUAWEI TECHNOLOGIES CO., LTD., Guangdong (CN)

(72) Inventors: Haifeng Yu, Beijing (CN); Bo Lin, Beijing (CN); Xin Xiong, Beijing (CN); Bin Xu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 39 days.

(21) Appl. No.: 16/671,768

(22) Filed: Nov. 1, 2019

(65) Prior Publication Data

US 2020/0068600 A1 Feb. 27, 2020

Related U.S. Application Data

(63) Continuation of application No. PCT/CN2018/085482, filed on May 3, 2018.

(30) Foreign Application Priority Data

May 3, 2017 (CN) .......................... 201710307267.9

(51) Int. Cl.
H04W 72/12 (2009.01)
H04W 28/02 (2009.01)
H04W 72/04 (2009.01)
H04W 80/02 (2009.01)
H04W 72/1268 (2023.01)

(52) U.S. Cl.
CPC ... *H04W 72/1268* (2013.01); *H04W 28/0278* (2013.01); *H04W 72/0413* (2013.01); *H04W 72/1257* (2013.01); *H04W 80/02* (2013.01)

(58) Field of Classification Search
CPC ......... H04W 72/1268; H04W 28/0278; H04W 72/0413; H04W 72/1257; H04W 80/02;
(Continued)

(56) References Cited

U.S. PATENT DOCUMENTS

2011/0255492 A1* 10/2011 Dai .................. H04W 72/1284
370/329
2014/0204800 A1 7/2014 Moulsley
(Continued)

FOREIGN PATENT DOCUMENTS

CN 101873704 A 10/2010
CN 102316582 A 1/2012
(Continued)

OTHER PUBLICATIONS

U.S. Appl. No. 62/476,309 (Year: 2017).*
(Continued)

*Primary Examiner* — Ian N Moore
*Assistant Examiner* — Rushil Parimal Sampat
(74) *Attorney, Agent, or Firm* — Womble Bond Dickinson (US) LLP

(57) ABSTRACT

A method for scheduling an uplink transmission resource, and a device are disclosed. The method includes: determining, by a terminal device, a first scheduling request according to pre-obtained first indication information when a first BSR is triggered because to-be-sent data exists on a first logical channel of the terminal device, where the first indication information is used to indicate a correspondence between a logical channel and a type of a scheduling request, and the first scheduling request includes a type of the first scheduling request; sending, by the terminal device, the first scheduling request to an access network device; and receiving, by the terminal device, first uplink scheduling information sent by the access network device, where the uplink scheduling information is used to indicate a first uplink resource used by the terminal device to send uplink data to the access network device.

20 Claims, 6 Drawing Sheets

(58) Field of Classification Search
CPC ... H04W 72/04; H04W 72/12; H04W 72/042; H04W 72/1221; H04W 72/1284; H04W 72/1289
See application file for complete search history.

(56) References Cited

U.S. PATENT DOCUMENTS

| | | | |
|---|---|---|---|
| 2015/0341938 A1* | 11/2015 | Tawashi | H04L 1/188 370/329 |
| 2017/0048857 A1 | 2/2017 | Vajapeyam et al. | |
| 2018/0152860 A1* | 5/2018 | Huang | H04L 5/0055 |
| 2018/0279353 A1* | 9/2018 | Shaheen | H04W 72/1284 |

FOREIGN PATENT DOCUMENTS

| | | |
|---|---|---|
| WO | 2014180351 A1 | 11/2014 |
| WO | 2016186698 A1 | 11/2016 |

OTHER PUBLICATIONS

3GPP TR 38.913 V14.2.0 (Mar. 2017),3rd Generation Partnership Project;Technical Specification Group Radio Access Network; Study on Scenarios and Requirements for Next Generation Access Technologies; (Release 14), total 38 pages.
3GPP TS 36.331 V14.2.2 (Apr. 2017),3rd Generation Partnership Project;Technical Specification Group Radio Access Network;Evolved Universal Terrestrial Radio Access (E-UTRA);Radio Resource Control (RRC);Protocol specification (Release 14), total 720 pages.
3GPP TS 36.321 V14.2.1 (Mar. 2017),3rd Generation Partnership Project;Technical Specification Group Radio Access Network;Evolved Universal Terrestrial Radio Access (E-UTRA);Medium Access Control (MAC) protocol specification (Release 14), total 106 pages.
3GPP TS 38.331 V0.0.2 (Mar. 2017),3rd Generation Partnership Project;Technical Specification Group Radio Access Network;NR; Radio Resource Control (RRC);Protocol specification(Release 15), total 13 pages.

\* cited by examiner

|   |   |   |   |   |   |   |   |   |
|---|---|---|---|---|---|---|---|---|
| LCG ID$_1$ | | | Data amount$_1$ | | | | | Oct 1 |
| Data amount$_1$ | | | LCG ID$_2$ | | | | | Oct 2 |
| Data amount$_2$ | | | | | | | | Oct 3 |
| ... | | | | | | | | |
| LCG ID$_{N-1}$ | | | Data amount$_{N-1}$ | | | | | Oct 1.5*N−2 |
| Data amount$_{N-1}$ | | | LCG ID$_N$ | | | | | Oct 1.5*N−1 |
| Data amount$_N$ | | | | | | | | Oct 1.5*N |

FIG. 5a

|   |   |   |   |   |   |   |   |   |
|---|---|---|---|---|---|---|---|---|
| LCG ID$_1$ | | | Data amount$_1$ | | | | | Oct 1 |
| Data amount$_1$ | | | LCG ID$_2$ | | | | | Oct 2 |
| Data amount$_2$ | | | | | | | | Oct 3 |
| ... | | | | | | | | |
| LCG ID$_N$ | | | Data amount$_N$ | | | | | Oct 1.5*N−0.5 |
| Data amount$_N$ | | | R | R | R | R | | Oct 1.5*N+0.5 |

FIG. 5b

RESOURCE ALLOCATION AND SCHEDULING USING A BUFFER STATUS REPORT (BSR)

CROSS-REFERENCE TO RELATED APPLICATIONS

This application is a continuation of International Application No. PCT/CN2018/085482, filed on May 3, 2018, which claims priority to Chinese Patent Application No. 201710307267.9, filed on May 3, 2017. The disclosures of the aforementioned applications are hereby incorporated by reference in their entireties.

TECHNICAL FIELD

The present disclosure relates to communications technologies, and in particular, to a method for scheduling an uplink transmission resource, and a device.

BACKGROUND

In a long term evolution (LTE) technology, an uplink scheduling procedure can be generally divided into the following five operations: sending a scheduling request (SR), allocating, by an evolved NodeB (eNB), an uplink resource (Uplink Grant, UL Grant) for sending a buffer status report (BSR), sending the BSR on the resource by a terminal, allocating, by the eNB, a UL grant for sending uplink data, and sending the uplink data by the terminal on the resource. Specifically, when there is data that needs to be sent, user equipment (UE) triggers a regular BSR when a case for triggering a BSR is met. After the UE triggers the regular BSR, if a case for triggering an SR is met, that is, a logicalChannel-SR-ProhibitTimer is not run, the SR is triggered, and a physical layer is instructed to send the SR on an available physical uplink control channel (PUCCH) resource. The UE sends an SR (1 bit) on the available PUCCH resource, to notify the eNB that the UE has to-be-sent data, and requests to allocate an uplink resource for sending the BSR. After receiving the SR sent by the UE, the eNB allocates the uplink resource to the UE to send the BSR. After receiving the allocated uplink resource, the UE sends the BSR on the corresponding resource, to notify the eNB of an amount of the to-be-sent data of the UE. After receiving the BSR sent by the UE, the eNB allocates, based on the BSR and a scheduling algorithm of the eNB, a resource required for sending the uplink data. After receiving the allocated uplink resource, the UE sends the uplink data on the corresponding resource, to implement transmission of the uplink data.

With development of mobile communications technologies, future fifth generation mobile communication (5G) becomes a hotspot in global research and development. Application scenarios of 5G are classified into three types in 3GPP TR 38.913: enhanced mobile broadband (eMBB), massive machine type communications (mMTC), and ultra-reliable and low-latency communications (URLLC).

There are various types of 5G services, and different services have different requirements. For example, the URLLC has a relatively high requirement on a latency and reliability. If the foregoing uplink scheduling mode in which the sr-prohibitTimer is used to limit a time interval of sending two consecutive SRs is used, another SR cannot be sent during a running time of the timer, making a resource scheduling delay relatively long. Consequently, the uplink resource scheduling mode in LTE cannot meet a requirement of a 5G network.

SUMMARY

Embodiments of the present disclosure provide a method for scheduling an uplink transmission resource, and a device, to resolve a problem that an uplink resource scheduling mode in LTE cannot meet a requirement of a 5G network.

A first aspect of the embodiments of the present disclosure provides a method for scheduling an uplink transmission resource. The method includes:

determining a first scheduling request according to pre-obtained first indication information when a first BSR is triggered because to-be-sent data exists on a first logical channel of a terminal device, where the first indication information is used to indicate a correspondence between a logical channel and a type of a scheduling request, and the first scheduling request includes a type that is of the first scheduling request and that is used to indicate uplink scheduling information required by the terminal device;

sending the first scheduling request to an access network device; and receiving first uplink scheduling information sent by the access network device, where the uplink scheduling information is used to indicate a first uplink resource used by the terminal device to send uplink data to the access network device.

In one embodiment, the method further includes:

sending the uplink data on the first uplink resource, where the uplink data includes the first BSR or the first BSR and the to-be-sent data.

In one embodiment, the method further includes:

receiving second uplink scheduling information sent by the access network device, where the second uplink scheduling information is used to indicate a second uplink resource that is configured for the terminal device by the access network device based on the first BSR and that is used to send buffered to-be-sent data to the access network device; and sending the to-be-sent data on the second uplink resource.

In one embodiment, during specific implementation, when the terminal device sends scheduling requests to the access network device for a plurality of times, the access network device may alternatively schedule, for the terminal device based on types of the scheduling requests, a second uplink resource that is used to send the buffered to-be-sent data.

In one embodiment, before the determining a first scheduling request according to pre-obtained first indication information when a first buffer status report (BSR) is triggered because to-be-sent data exists on a first logical channel of a terminal device, the method further includes:

receiving the first indication information sent by the access network device.

In one embodiment, the first indication information further includes:

the correspondence between a logical channel and a type of the scheduling request; or a correspondence between a logical channel and a resource use attribute, and a correspondence between a resource use attribute and a type of the scheduling request; or a correspondence between a type of the scheduling request and a service group, and a correspondence between a logical channel and a service priority; or a correspondence between a type of the scheduling request and a priority of the logical channel.

In one embodiment, the sending the first scheduling request to an access network device includes:

instructing a physical layer to send the first scheduling request to the access network device on a physical uplink control channel (PUCCH) corresponding to the type of the first scheduling request; or instructing a physical layer to send the first scheduling request to the access network device on an available physical uplink control channel (PUCCH).

In one embodiment, the first logical channel is used to send high-priority service data.

In one embodiment, a duration of a scheduling request prohibit timer of the first logical channel is less than a duration of a scheduling request prohibit timer of another logical channel. For example, the duration of the scheduling request prohibit timer of the first logical channel is zero.

In another specific implementation, in response to a determination that the first BSR is triggered because the to-be-sent data exists on the first logical channel, a scheduling request prohibit timer corresponding to the terminal device is disabled.

In one embodiment, before the sending the first scheduling request to an access network device, the method further includes:

canceling the first scheduling request when detecting that a scheduling request canceling case is met, where the scheduling request canceling case includes any one of the following cases:

the first BSR is carried in a to-be-sent MAC PDU;

uplink resources that have been allocated by the access network device to the terminal device are sufficient for transmitting all to-be-sent data;

the terminal device has received an uplink resource that is allocated by the access network device and that corresponds to the type of the first scheduling request; and the access network device configures a grant-free uplink resource for the terminal device.

A second aspect of the embodiments of the present disclosure provides a method for scheduling an uplink transmission resource. The method includes:

receiving a first scheduling request sent by a terminal device, where the first scheduling request includes a type that is of the first scheduling request and that is used to indicate uplink scheduling information required by the terminal device;

determining the type of the first scheduling request, and scheduling, for the terminal device based on the type of the first scheduling request, a first uplink resource that is used to send uplink data; and sending first uplink scheduling information to the terminal device, where the first uplink scheduling information is used to indicate the first uplink resource.

In one embodiment, the method further includes:

receiving the uplink data sent by the terminal device on the first uplink resource, where the uplink data includes a first BSR or the first BSR and data.

In one embodiment, the method further includes:

scheduling, for the terminal device based on the first BSR, a second uplink resource that is used to upload the data;

sending second uplink scheduling information to the terminal device, where the second uplink scheduling information is used to indicate the second uplink resource; and receiving, on the second uplink resource, the data sent by the terminal device.

In one embodiment, during specific implementation, when the access network device receives scheduling requests that are sent by the terminal device for a plurality of times, the access network device may alternatively schedule, for the terminal device based on types of the scheduling requests, a second uplink resource that is used to send the buffered to-be-sent data.

In one embodiment, before the receiving a first scheduling request sent by a terminal device, the method further includes:

sending first indication information to the terminal device, where the first indication information is used to indicate a correspondence between a logical channel and a type of a scheduling request.

In one embodiment, the first indication information includes:

the correspondence between a logical channel and a type of the scheduling request; or a correspondence between a logical channel and a resource use attribute, and a correspondence between a resource use attribute and a type of the scheduling request; or a correspondence between a type of the scheduling request and a service group, and a correspondence between a logical channel and a service priority; or a correspondence between a type of the scheduling request and a priority of the logical channel.

In one embodiment, the determining the type of the first scheduling request includes:

determining the type of the first scheduling request based on a PUCCH on which the first scheduling request is received and a pre-configured correspondence between a type of a scheduling request and a PUCCH; or determining the type of the first scheduling request based on a quantity of first scheduling requests received in a preset duration.

A third aspect of the embodiments of the present disclosure provides an apparatus for scheduling an uplink transmission resource. The apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit. The storage unit may be a memory. The storage unit is configured to store an instruction. The processing unit executes the instruction stored in the storage unit, so that the terminal device performs the method for scheduling an uplink transmission resource according to the first aspect or the various implementations of the first aspect. When the apparatus is a chip in a terminal device, the processing unit may be a processor, and the transceiver unit may be an input/output interface, a pin, a circuit, or the like. The processing unit executes an instruction stored in a storage unit, so that the terminal device performs the method for scheduling an uplink transmission resource according to the first aspect or the various implementations of the first aspect. The storage unit may be a storage unit in the chip (for example, a register and a buffer), or may be a storage unit in the terminal device and out of the chip (for example, a read-only memory or a random access memory).

A fourth aspect of the embodiments of the present disclosure provides an apparatus for scheduling an uplink transmission resource. The apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit. The storage unit may be a memory. The storage unit is configured to store an instruction. The processing unit executes the instruction stored in the storage unit, so that the network device performs the method for scheduling an uplink transmission resource according to the second aspect or the various implementations of the second aspect. When the apparatus is a chip in a network device, the processing unit may be a processor, and the transceiver unit may be an input/output interface, a pin, a circuit, and the like. The processing unit executes an instruction stored in a storage unit, so that the network device performs the method for scheduling an uplink transmission resource according to the second aspect or the various implementations of the second aspect. The storage unit may be a storage unit in the chip (for example, a register and a buffer), or may be a storage unit in the network device and out of the chip (for example, a read-only memory or a random access memory).

A fifth aspect of the embodiments of the present disclosure provides an apparatus for scheduling an uplink transmission resource. The apparatus includes a processor and a storage medium. The storage medium stores an instruction. When the instruction is run by the processor, the processor is enabled to perform the method for scheduling an uplink transmission resource according to the first aspect or the various implementations of the first aspect. The apparatus may be a chip or a chip system.

A sixth aspect of the embodiments of the present disclosure provides an apparatus for scheduling an uplink transmission resource. The apparatus includes a processor and a storage medium. The storage medium stores an instruction. When the instruction is run by the processor, the processor is enabled to perform the method for scheduling an uplink transmission resource according to the second aspect or the various implementations of the second aspect. The apparatus may be a chip or a chip system.

A seventh aspect of the embodiments of the present disclosure provides a computer storage medium. The computer storage medium stores a computer-executable instruction. When the computer-executable instruction is invoked by a computer, the computer is enabled to perform the method for scheduling an uplink transmission resource according to the first aspect or the various implementations of the first aspect.

An eighth aspect of the embodiments of the present disclosure provides a computer storage medium. The computer storage medium stores a computer-executable instruction. When the computer-executable instruction is invoked by a computer, the computer is enabled to perform the method for scheduling an uplink transmission resource according to the second aspect or the various implementations of the second aspect.

A ninth aspect of the embodiments of the present disclosure provides a program product. The program product includes a computer program (that is, an execution instruction), and the computer program is stored in a readable storage medium. At least one processor of a terminal device may read the computer program from the readable storage medium, and the at least one processor executes the computer program, so that the terminal device implements the method for scheduling an uplink transmission resource according to the first aspect or the various implementations of the first aspect.

A tenth aspect of the embodiments of the present disclosure provides a program product. The program product includes a computer program (that is, an execution instruction), and the computer program is stored in a readable storage medium. At least one processor of an access network device may read the computer program from the readable storage medium, and the at least one processor executes the computer program, so that the access network device implements the method for scheduling an uplink transmission resource according to the second aspect or the various implementations of the second aspect.

According to the method for scheduling an uplink transmission resource and the device provided in the embodiments of the present disclosure, the terminal device determines the first scheduling request according to the pre-obtained first indication information when the first BSR is triggered because the to-be-sent data exists on the first logical channel of the terminal device, where the first indication information is used to indicate the correspondence between a logical channel and a type of the scheduling request, and the first scheduling request includes the type of the first scheduling request; the terminal device sends the first scheduling request to the access network device; and the terminal device receives the first uplink scheduling information sent by the access network device, where the uplink scheduling information is used to indicate the first uplink resource used by the terminal device to send the uplink data to the access network device. The access network device may distinguish between scheduling requests of a service based on types of the scheduling requests, to quickly and properly schedule a resource for the terminal device.

BRIEF DESCRIPTION OF DRAWINGS

FIG. 5a is a schematic diagram of a BSR format;

FIG. 5b is a schematic diagram of another BSR format;

DESCRIPTION OF EMBODIMENTS

The technical solutions of the embodiments of the present disclosure may be applied to a 5G or a future communications system, and may also be applied to various other communications systems, such as: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, and a universal mobile telecommunications system (UMTS).

Figure 1:
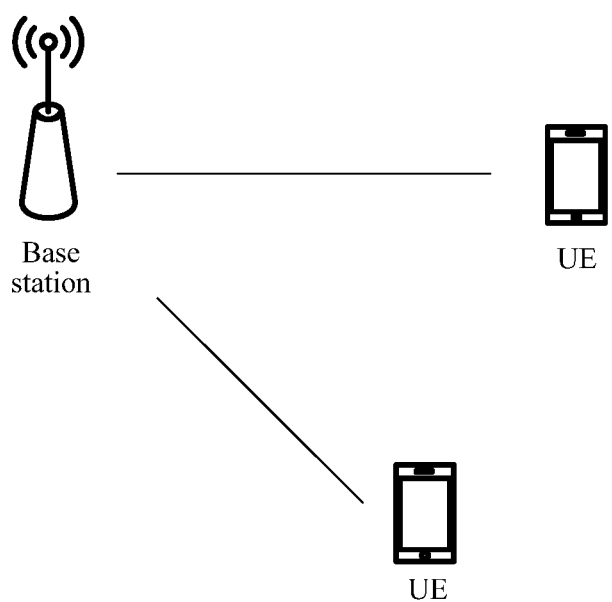
FIG. 1 is a schematic diagram of an application scenario of a method for scheduling an uplink transmission resource according to an embodiment of the present disclosure.

FIG. 1 is a schematic diagram of an application scenario of a method for scheduling an uplink transmission resource according to an embodiment of the present disclosure. As shown in FIG. 1, in the application scenario, the method for scheduling an uplink transmission resource is applied between a base station and user equipment (UE). When scheduling a resource for the UE, the base station may schedule the resource based on the solution. The base station is used as an access network device, and the UE is used as a terminal device.

During actual application, the access network device may further be a base station (BTS) in a global system for mobile communications (GSM) or code division multiple access (CDMA), or may be a NodeB (NB) in wideband code division multiple access (WCDMA), or may further be an evolved NodeB (Evolutional NodeB, eNB or eNodeB) in LTE, or a relay station or an access point, or a base station in a future 5G network, or the like. This is not limited herein.

A terminal device may be a wireless terminal or a wired terminal. The wireless terminal may refer to a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) or a computer with a mobile terminal, for example, may be a portable, a pocket-sized, a handheld, computer built-in, or an in-vehicle mobile apparatus, which exchanges voice and/or data with the radio access network. For example, the terminal device may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, a remote terminal, an access terminal, a user terminal, a user agent, or a user device (or User Equipment). This is not limited herein.

Figure 2:
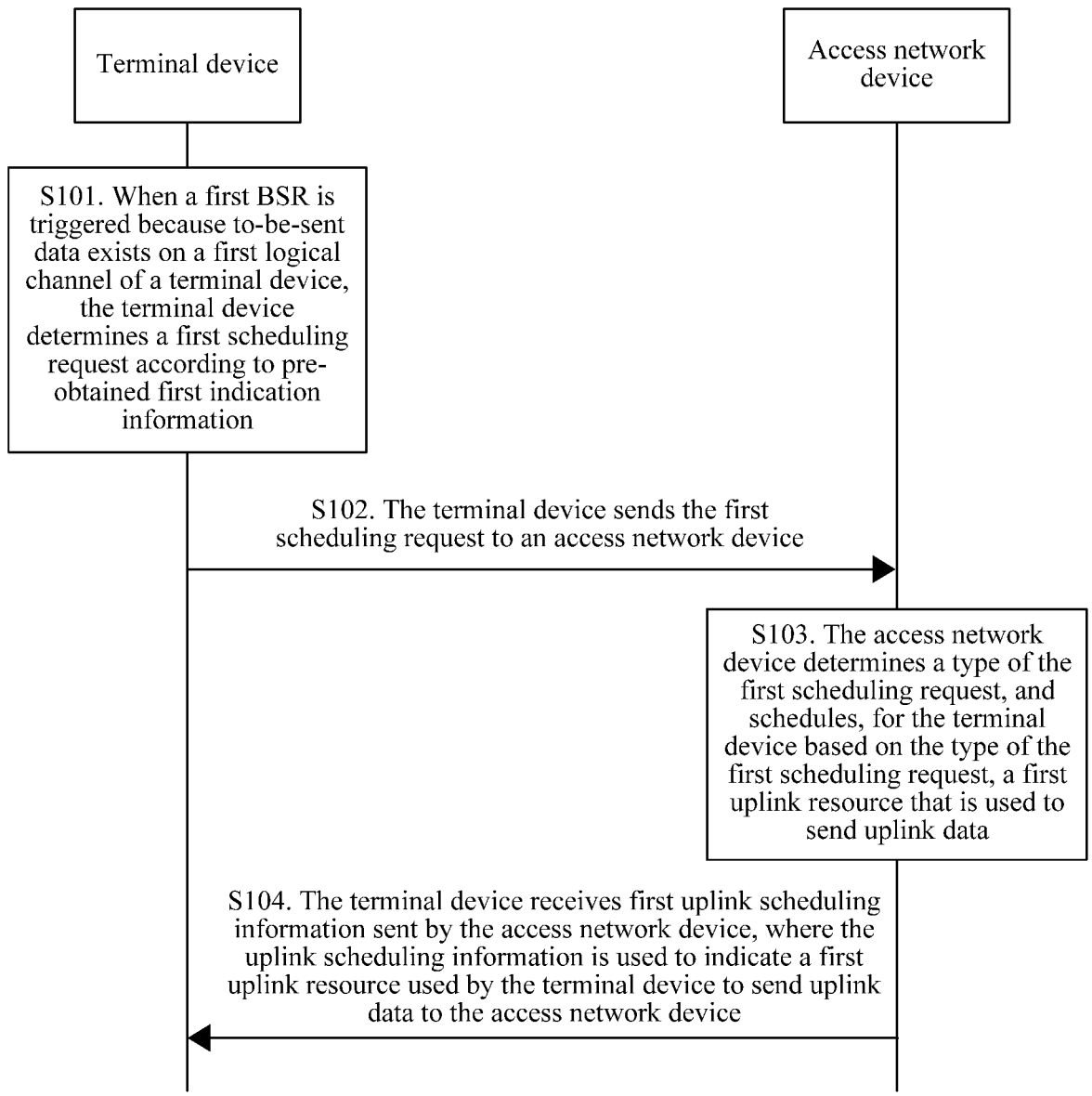
FIG. 2 is an interaction flowchart of Embodiment 1 of a method for scheduling an uplink transmission resource according to an embodiment of the present disclosure.

FIG. 2 is an interaction flowchart of Embodiment 1 of a method for scheduling an uplink transmission resource according to an embodiment of the present disclosure. As shown in FIG. 2, specific implementation operations of the method for scheduling an uplink transmission resource are as follows.

Operation S101. When a first BSR is triggered because to-be-sent data exists on a first logical channel of a terminal device, the terminal device determines a first scheduling request according to pre-obtained first indication information.

In this operation, the first indication information is used to indicate a correspondence between a logical channel and a type of a scheduling request, and the first scheduling request includes a type that is of the first scheduling request and that is used to indicate uplink scheduling information required by the terminal device.

The terminal device may obtain a relationship between the logical channel and the type of the scheduling request in advance based on configuration of an access network device, or negotiation with an access network device side, or a stipulation in a protocol, or the like. This is not limited in this solution.

When there is data that needs to be sent and a case for triggering a BSR is met, the BSR, that is, the foregoing first BSR, may be triggered. In this case, the terminal device needs to send the scheduling request to the access network device, so that the access network device schedules a resource, on which the BSR is sent, for the terminal device. In this process, the terminal device needs to first determine, according to the obtained first indication information and the logical channel on which the data is buffered, a type of the to-be-sent scheduling request. In one embodiment, the type of the scheduling request may be carried in the scheduling request.

In one embodiment, before operation S101, the method further includes: receiving, by the terminal device, the first indication information sent by the access network device. That is, the terminal device obtains the first indication information through notification of the access network device.

Operation S102. The terminal device sends the first scheduling request to an access network device.

In this operation, if the access network device configures a dedicated resource for a first scheduling request of the type, the terminal device needs to send the first scheduling request on the corresponding resource configured by the access network device; or if the access network device does not configure a dedicated resource for a first scheduling request of the type, the terminal device may instruct a lower layer to directly send the first scheduling request on an available resource.

For the access network device, the access network device receives the first scheduling request sent by the terminal device, and then allocates a resource to the terminal device based on the first scheduling request.

In one embodiment, the terminal device instructs a physical layer to send the first scheduling request to the access network device on a physical uplink control channel (PUCCH) corresponding to the type of the first scheduling request.

Alternatively, the terminal device instructs a physical layer to send the first scheduling request to the access network device on an available PUCCH.

Operation S103. The access network device determines a type of the first scheduling request, and schedules, for the terminal device based on the type of the first scheduling request, a first uplink resource that is used to send uplink data.

In this operation, the access network device may directly allocate a resource based on the type that is of the first scheduling request and that is carried in the first scheduling request, and may further determine the type of the first scheduling request in the following several manners.

In a first manner, the access network device determines the type of the first scheduling request based on a PUCCH on which the first scheduling request is received and a pre-configured correspondence between a type of a scheduling request and a PUCCH.

That is, based on a relationship that is pre-configured by the access network device and that is between the PUCCH and the scheduling request, the access network device may determine the type of the first scheduling request based on the received PUCCH even though the first scheduling request sent by the terminal device does not carry the type.

In a second manner, the access network device determines the type of the first scheduling request based on a quantity of first scheduling requests received in a preset duration. Frequencies at which scheduling requests that are of different service priorities and that can be sent or quantities of scheduling requests that are of different service priorities and that can be sent are different, and therefore the access network device may further determine the type based on a quantity of scheduling requests that are received in the preset duration.

After determining the type of the scheduling request, for different types of scheduling requests, the access network device may use different scheduling modes and allocate corresponding resources. For example, for a scheduling request having a relatively high priority, an uplink resource may be independently scheduled, or a processing time may be shortened, that is, a resource is preferentially allocated to a scheduling request having a high priority and is quickly delivered to the terminal device.

Operation S104. The terminal device receives first uplink scheduling information sent by the access network device, where the uplink scheduling information is used to indicate a first uplink resource used by the terminal device to send uplink data to the access network device.

In this operation, the access network device sends first uplink scheduling information to the terminal device, and the first uplink scheduling information is used to indicate the first uplink resource. After allocating the resource to the terminal device, the access network device may notify the terminal device of the uplink resource. A specific notification manner may be adding the uplink resource to downlink information, or specially sending a first uplink scheduling request that indicates the resource. This is not limited in this solution.

According to the method for scheduling an uplink transmission resource provided in this embodiment, when the first BSR is triggered because the to-be-sent data exists on the first logical channel of the terminal device, the terminal device determines the first scheduling request according to the pre-obtained first indication information, and sends the first scheduling request that carries the type information to the access network device. The access network device allocates the uplink resource to the terminal device based on the type of the scheduling request, and notifies the terminal device of the uplink resource. The terminal device adds the type of the scheduling request to the scheduling request based on the correspondence between a logical channel and a type when sending the scheduling request to the access network device. The access network device may distinguish between scheduling requests of a service based on types of the scheduling requests, to quickly and properly schedule a resource for the terminal device.

Based on the foregoing embodiment, in one embodiment of the method for scheduling an uplink transmission resource, the first indication information sent by the access network device to the terminal device further includes but is not limited to at least one of the following:

the correspondence between a logical channel and a type of the scheduling request; or a correspondence between a logical channel and a resource use attribute, and a correspondence between a resource use attribute and a type of the scheduling request; or a correspondence between a type of the scheduling request and a service group, and a correspondence between a logical channel and a service priority; or a correspondence between a type of the scheduling request and a priority of the logical channel.

Data that needs to be sent by the terminal device and that needs to be transmitted in uplink has specific attribute information. Data in a same service group has a same or similar attribute, and the attribute may be a type of a service or a service quality requirement of the service, for example, a transmission delay or reliability. Therefore, the terminal device can determine a service priority, or a logical channel, or a priority of a logical channel based on the one or more of the attributes, and then obtains the type of the first scheduling request based on the foregoing correspondences.

For example, in one embodiment, the first logical channel is configured to send high-priority service data. When the BSR is triggered on the first logical channel, the type of the scheduling request may be determined based on the service priority.

In one embodiment, a duration of a scheduling request prohibit timer of the first logical channel may be set to be less than a duration of a scheduling request prohibit timer of another logical channel. For example, the duration of the scheduling request prohibit timer of the first logical channel may be set to zero, so that the first scheduling request can be quickly sent to the access network device.

In one embodiment, when the scheduling request prohibit timer is configured for each terminal device, in response to a determination that the first BSR is triggered because the to-be-sent data exists on the first logical channel, a scheduling request prohibit timer corresponding to the terminal device is disabled. A meaning thereof is as follows. When finding that the first BSR is triggered on the first logical channel, the terminal device may disable the scheduling request prohibit timer, that is, prohibit the scheduling request prohibit timer from running. In a running period of the scheduling request prohibit timer of the terminal, the scheduling request of the first logical channel can still be sent. The disabling may be indicated by indication information to disable the scheduling request prohibit timer sent by the access network device in the first logical channel, or may be stipulated in a protocol. This is not limited in this solution.

Figure 3:
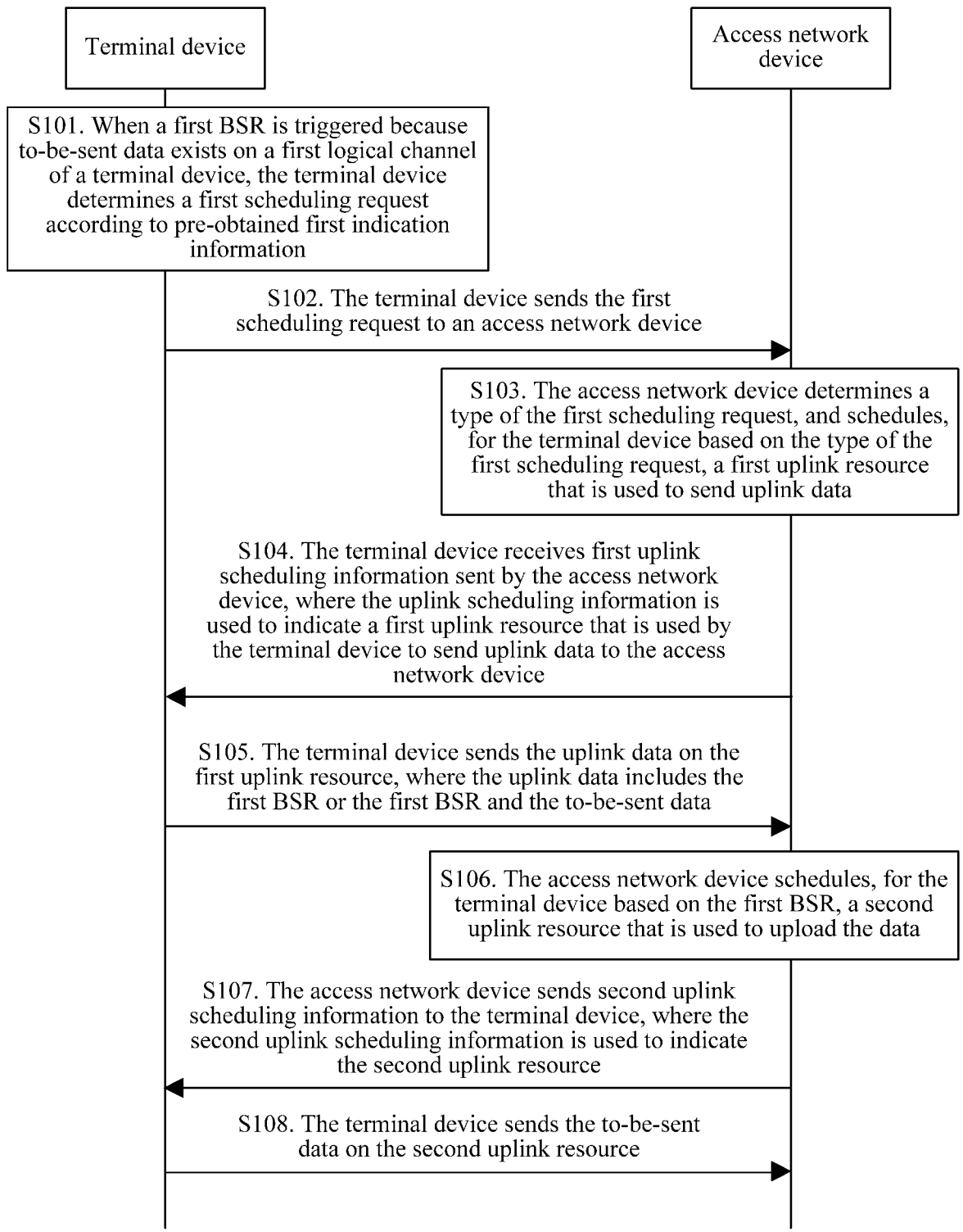
FIG. 3 is an interaction flowchart of Embodiment 2 of a method for scheduling an uplink transmission resource according to an embodiment of the present disclosure.

FIG. 3 is an interaction flowchart of Embodiment 2 of a method for scheduling an uplink transmission resource according to an embodiment of the present disclosure. As shown in FIG. 3, based on the foregoing Embodiment 1, after operation S104, the method may further include the following the operations.

Operation S105. The terminal device sends the uplink data on the first uplink resource, where the uplink data includes the first BSR or the first BSR and the to-be-sent data.

In this operation, after determining the first uplink resource based on the first uplink scheduling information sent by the access network, the terminal device may perform data transmission on the first uplink resource, that is, send the first BSR to the access network device on the first uplink resource. Alternatively, the first BSR and the buffered uplink data may be simultaneously sent on the first uplink resource. This is not limited in this solution.

Operation S106. The access network device schedules, for the terminal device based on the first BSR, a second uplink resource that is used to upload the data.

In one embodiment, in another implementation, when the terminal device sends the scheduling request to the access network device for a plurality of times, the access network device may further schedule, for the terminal device based on the type of the scheduling request, a second uplink resource on which data is transmitted. This is not limited in this solution.

Operation S107. The access network device sends second uplink scheduling information to the terminal device, where the second uplink scheduling information is used to indicate the second uplink resource.

Likewise, the second uplink scheduling information is used to indicate the second uplink resource that is configured for the terminal device by the access network device based on the first BSR or the type of the first scheduling request and that is used to send buffered to-be-sent data to the access network device.

Operation S108. The terminal device sends the to-be-sent data on the second uplink resource.

In the foregoing several operations, after receiving the first BSR sent by the terminal device, the access network device schedules, for the terminal device based on the BSR, the second uplink resource on which the data is sent; and notifies the terminal device of the second uplink resource, so that the terminal device sends the to-be-sent data on the second uplink resource.

In the foregoing embodiment in FIG. 1 or FIG. 2, for different types of scheduling requests, a pending scheduling request may be canceled when any one of the following cases is met:

Case 1. The first BSR is carried in one or more to-be-sent media access control protocol data units (MAC PDU).

Case 2. Uplink resources that have been allocated by the access network device to the terminal device are sufficient for transmitting all to-be-sent data.

Case 3. The terminal device has received an uplink resource that is allocated by the access network device and that corresponds to the type of the first scheduling request.

Case 4. The access network device configures a grant-free uplink resource for the terminal device.

According to the method for scheduling an uplink transmission resource provided in the foregoing embodiment, the first indication information that is sent by the access network device to the terminal device indicates the correspondence between a logical channel and a type of the scheduling request, so that after the BSR is triggered because data needs to be sent on the logical channel, the terminal device determines the type of the scheduling request, and then sends the scheduling request that carries the type to the access network device. Therefore, the access network device can distinguish between service types or priorities based on the types of the received scheduling requests, to implement quick and proper resource allocation.

Based on the foregoing two embodiments, the following describes in detail the method for scheduling an uplink transmission resource provided in this embodiment of the present disclosure, by using the application scenario in FIG. 1 as an example. In the application scenario, the access network device is the eNB and the terminal device is the UE.

Figure 4:
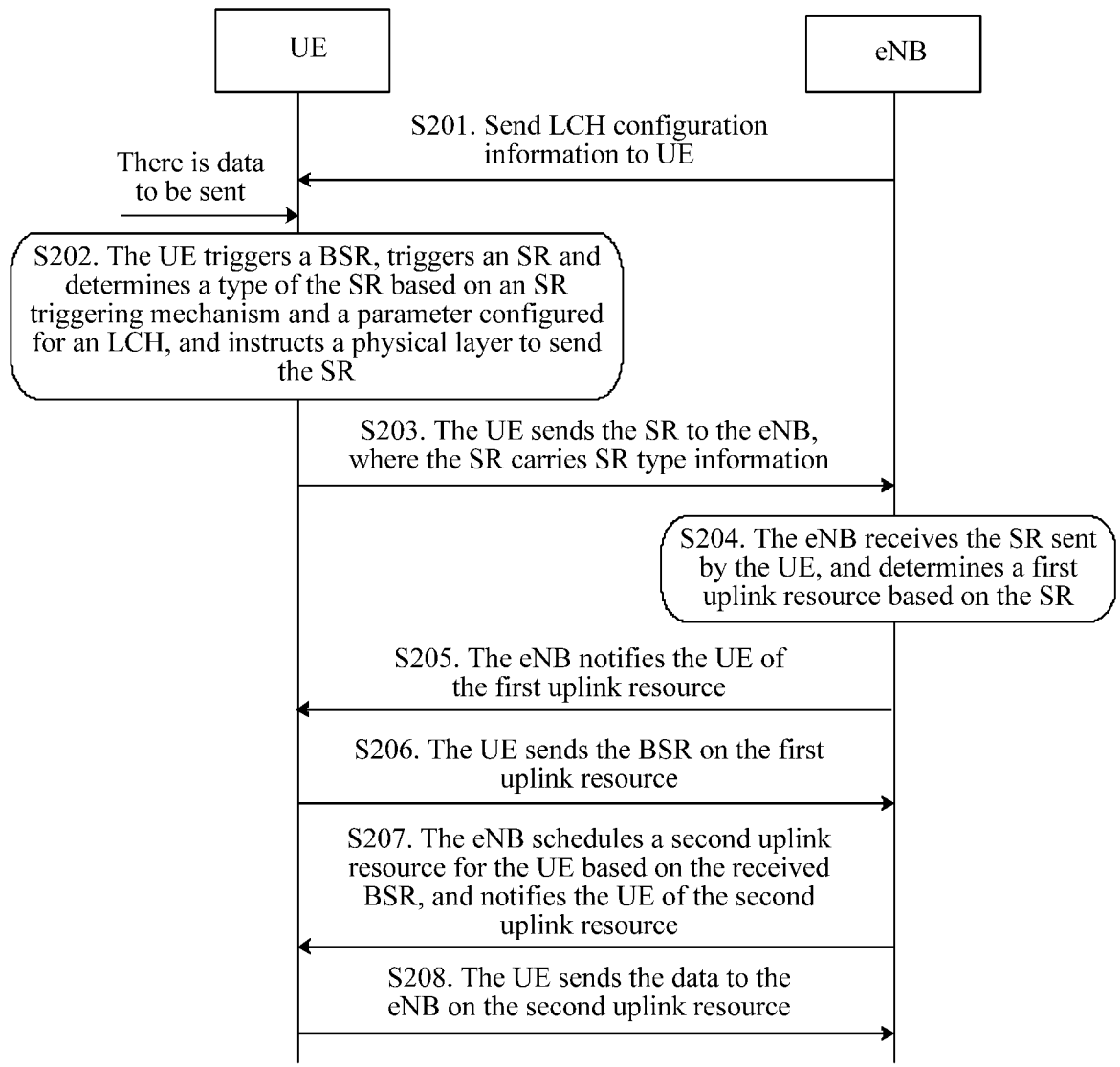
FIG. 4 is an interaction flowchart of an instance of a method for scheduling an uplink transmission resource according to an embodiment of the present disclosure.

FIG. 4 is an interaction flowchart of an instance of a method for scheduling an uplink transmission resource according to an embodiment of the present disclosure. As shown in FIG. 4, in one embodiment, the method for scheduling an uplink resource specifically includes the following operations.

Operation S201. Send LCH configuration information to UE.

In this operation, an eNB sends the logical channel (LCH) configuration information (equivalent to the foregoing first indication information) to the UE. The LCH configuration information includes a correspondence between a logical channel (or a logical channel group) and a resource use attribute (numerology), scheduling request (SR) parameter configuration, and BSR parameter configuration. The LCH configuration information may be notified by using radio resource control (RRC) signaling/a MAC control element, or the like.

The SR parameter configuration may include a correspondence between an SR triggering type and a numerology/a transmission time interval (TTI), or a correspondence between a SR triggering type and a service priority, or a correspondence between a SR triggering type and a priority of the logical channel, or the like.

In one embodiment, the SR parameter configuration may further include a timer that is related to an SR, for example, a timer that limits sending of the SR, that is, an sr-Prohibit-Timer, or a timer that limits triggering of the SR, that is, a logicalChannelSR-ProhibitTimer.

In one embodiment, the SR parameter configuration may further include configuration of an LCH that has a function of quickly triggering an SR, that is, quickly triggering the SR when some new SR triggering cases are met.

The BSR parameter configuration includes a BSR-related timer, and a correspondence between a logical channel or a logical channel group and a numerology in a BSR reporting process.

Operation S202. The UE triggers a BSR, triggers an SR and determines a type of the SR based on an SR triggering mechanism and a parameter configured for an LCH, and instructs a physical layer to send the SR.

In this operation, when there is data that needs to be sent and a regular BSR triggering case is met, the regular BSR can be triggered. Once the BSR is triggered because ultra-reliable and low-latency (URLLC) data exists, the SR can be triggered immediately. One embodiment is as follows:

(1) Quick Triggering of an SR

The UE is configured with two sets of SR triggering mechanisms at the same time, and quick triggering needs to be performed on only an LCH that is configured with a special function, and the UE instructs the physical layer to send an SR (where some new triggering cases and a small value of a timer are used herein, to implement quick triggering). Reporting on another logical channel may be normally performed.

In this configuration manner, a protocol needs to be changed a lot, and only a small change needs to be made. For a logical channel that is configured with only an indication of enabling SR quick triggering, an operation of quickly triggering an SR needs to be performed, and no other change needs to be performed.

Specific implementation operations of the foregoing solution (the procedure of quick triggering) are as follows.

1. The UE may have two sets of SR triggering mechanisms at the same time, to meet a requirement of sending different services by the UE. One of the two sets of mechanisms is shared by all logical channels, and the other set is independently configured for a specific logical channel. When a set of mechanism is independently configured for a specific logical channel, a set of mechanism that is shared can be ignored.

2. An information element (IE) that is used to indicate whether a specific logical channel supports SR triggering mechanism enhancement is added to an RRC reconfiguration message: logicalChannel-SR-Triggering-Enhancement-r15, and the logical channel corresponds to a specific type of high-priority service (URLLC).

3. When the resource block (RB) is added during RRC reconfiguration, SR triggering enhancement mechanism configuration corresponding to the RB or corresponding to a logical channel is added (for example, a logicalChannelSR-ProhibitTimer configured for per-UE is ignored, or a new SR triggering mechanism is used).

4. When the UE receives the RRC reconfiguration message, the logicalChannel-SR-Triggering-Enhancement-r15 configuration that is available for a current TTI is checked first:

(1) If the logicalChannel-BSR-Triggering-Enhancement-r15 configuration is true, the SR triggering enhancement is supported. When a high-priority service that is available to be sent exists on a logical channel for which the BSR triggering enhancement is configured. A BSR is triggered in time on this logical channel and a physical layer is instructed to send an SR on an available PUCCH resource, thereby obtaining a UL grant as early as possible.

(2) Otherwise, a Normal Procedure is Performed.

Descriptions of the SR quick triggering mechanism are as follows:

1. For a service having a relatively high latency requirement, an LCH-specific logicalChannelSR-ProhibitTimer can be configured, and timers of the LCHs can be set to be relatively small (especially, when numerologies with different durations of TTIs are introduced to 5G, the processing capabilities of the different LCHs are different, and therefore control capabilities of the timers and the like can be set to be different).

In the configuration of the per-UE, the BSR is triggered because there is a to-be-sent data packet that corresponds to URLLC, and the logicalChannelSR-ProhibitTimer of the LCH is started. Different from an LTE mechanism in which the timer may be started or re-started, herein there is only start but no re-start. Once the timer times out, the SR can be triggered.

2. For a service having a relatively high latency requirement, an indication may be added to the LCH configuration to disable the logicalChannelSR-ProhibitTimer, that is, when triggering an SR, the LCH that corresponds to URLLC is not limited by the timer.

3. For a service having a relatively high latency requirement, an indication may be added to the LCH configuration to disable the logicalChannelSR-ProhibitTimer, that is, when triggering an SR, the LCH that corresponds to URLLC is not limited by the timer; but triggering of the SR introduces a new SR triggering mechanism, and the new SR triggering mechanism can be used through configuration by the LCH that corresponds to URLLC.

(2) Determining of an SR Type

Methods for dividing SR types may include:

division based on a service type and an importance degree, for example, types of regular BSRs that are triggered by different services;

a priority of a logical channel;
a logical channel group;
a numerology/TTI of a logical channel; and
others.

Specifically, the eNB may configure an SR type and a type of a triggered regular BSR, or a correspondence between an SR type and a logical channel or a logical channel group or a numerology/TTI of a logical channel, or the like, and notifies the UE of the correspondence by using RRC signaling or a MAC control element (CE). The UE determines the SR type by using the correspondence.

The types of the regular BSRs that are triggered by the different services include:

different BSRs that are triggered by different services by using a same BSR triggering mechanism, and the different BSRs are triggered because to-be-sent data exists on LCHs/LCGs that correspond to the services; or different BSRs that are triggered by different services by using different BSR triggering mechanisms. Specifically, different triggering mechanisms are configured for LCHs/LCGs that correspond to the different services. For example, for a service that is relatively sensitive to a latency requirement, for example, URLLC, a function of quickly triggering a BSR can be configured for an LCH/LCG that corresponds to the URLLC; and if the function is configured, when the following cases are met, the UE can quickly trigger a regular BSR:

(1) An uplink buffer of the UE is empty and there is new data that needs to be sent. For example, the UE sends uplink data for the first time.

(2) To avoid that the UE sends the BSR but has never received the UL grant, a retxBSR-Timer can be configured. When the retxBSR-Timer times out, and there is data that is on any logical channel of any LCG of the UE and that can be sent, a "Regular BSR" is triggered. Herein, for a service having a relatively high latency requirement, an RB-specific retxBSR-Timer can be configured (especially, when numerologies with different durations of TTIs are introduced to 5G, the processing capabilities of different RBs are different, and therefore control capabilities of the timers and the like can be set to be different).

(3) When the UE has sent the BSR, before the retxBSR-Timer times out, if a quantity of data bits or data packets in the buffer reaches a specific threshold (where the threshold is configured when both a BSR triggering delay and unnecessary overheads are considered), the "regular BSR" is triggered.

(4) When the UE has sent the BSR, before the retxBSR-Timer times out, if a speed at which new data that needs to be sent in the buffer reaches a specific case (based on the speed at which the data needs to be sent in the buffer, it is determined in advance that an amount of data that subsequently needs to be sent in the buffer is very large, and a UL grant needs to be applied for in advance), the "regular BSR" is triggered.

Operation S203. The UE sends the SR to an eNB, where the SR carries information about a type of the SR.

In one embodiment of this operation, the UE may instruct a lower layer, for example, the physical layer, to send an SR on a PUCCH resource.

If the eNB configures PUCCH resources corresponding to different types of SRs (in a one-to-one correspondence), after the UE determines a type of an SR, the UE instructs a lower layer, for example, the physical layer, to send an SR on a PUCCH resource corresponding to the SR type; or if the eNB does not configure a correspondence between an SR type and a PUCCH resource, the UE instructs a lower layer to send an SR on an available PUCCH resource, and the PUCCH resource on which the SR is finally sent depends on the UE.

One embodiment of this operation includes SR sending and SR type information carrying. Specifically:

(1) SR Sending

When instructing a lower layer to send an SR on an available PUCCH, the UE starts an sr-prohibitTimer. The timer is used to limit a time interval of sending two consecutive SRs, that is, in running time of the timer, another SR cannot be sent. However, the timer is of per-UE, and for URLLC, once the SR fails to be sent, the SR can be requested again only when the timer times out. Consequently, a delay for obtaining the UL grant is relatively large, and timer setting of the per-UE is inappropriate.

In view of this, different sr-prohibitTimers are set for different types of SRs, so that the UE can distinguish between sending of the different types of SRs. Possible options are as follows:

Option 1: Configure a UE-specific sr-ProhibitTimer. However, the timer does not work for an LCH that corresponds to URLLC.

Option 2: Configure an LCH-specific sr-ProhibitTimer, and the timer of an LCH/LCG that corresponds to URLLC is set to be small.

Comparison between the two options is shown in the following table:

TABLE 1

Comparison between the two options for setting the sr-ProhibitTimers

| | Option 1 | Option 2 |
|---|---|---|
| sr-ProhibitTimer configuration | A timer is configured for per-UE, but the timer does not work for the LCH that corresponds to the URLLC (where an indication for disabling an sr-ProhibitTimer is added to a specific LCH) | A timer is configured for per-LCH, and a timer that corresponds to the LCH corresponding to the URLLC is set to be relatively small. |
| Analysis | During running of the sr-ProhibitTimer, a plurality of SRs may be sent, and if an SR has already been sent, when a high-priority SR is triggered, the high-priority SR can be sent. | The timer is set to be small, and at the same time intervals of PUCCH resources need to be set to be short in time domain, and a period of a PUCCH resource needs to be set to be short. |

(2) Information about a Type of an SR is Carried when the SR is Sent

A type of an SR can be carried in two manners: an explicit manner and an implicit manner when the SR is sent by the UE.

Explicit Carrying:

After determining the type of the SR, the UE explicitly indicates the SR type by using a multi-bit SR. Currently, an LTE SR has only 1 bit that is used to indicate whether there is to-be-sent data, and a quantity of bits in an SR may be extended in NR, to carry the information about the SR type. In one embodiment, the multi-bit SR may further carry a BSR corresponding to the to-be-sent data of the UE, or a quantity of to-be-sent LCGs in the UE, thereby assisting the eNB in allocating a resource on which the BSR is sent. Other possible information is not excluded.

Implicit Carrying:

If the eNB configures a correspondence between an SR type and a PUCCH resource, after the UE determines the SR type, the UE sends the SR type on the corresponding PUCCH resource. The eNB determines information about the SR type by using a location of the PUCCH resource. For example, a high-priority SR can be sent only on a short-duration PUCCH, and a low-priority SR can be sent only on a long-duration PUCCH.

If the eNB does not configure a correspondence between an SR type and a PUCCH resource, that is, PUCCHs on which different types of SRs are sent depend on the UE. After determining an SR type, the UE may distinguish between manners of sending different types of SRs. After the UE sends an SR, the UE instructs a lower layer to send a high-priority SR only when the high-priority SR is triggered. The eNB identifies SR types by using a quantity of received SRs.

Note: To prevent a high-priority SR from frequently sending an SR, a maximum quantity of to-be-sent SRs of different SR types can be limited before a UL grant is received (a numerology is introduced to NR, a numerology-specific PUCCH resource is not excluded, and a maximum quantity of to-be-sent SRs may be limited to not exceeding a quantity of PUCCH resource types that can be supported).

In the solution, a combination of explicit+implicit manners is not excluded, that is, an SR that is sent in the implicit carrying manner is a multi-bit SR.

Operation S204. The eNB receives the SR sent by the UE, and determines a first uplink resource based on the SR.

In this operation, the eNB receives and identifies different SR types, and uses different scheduling modes and allocates corresponding resource types for the different SR types. Specifically:

For a high-priority SR, a UL grant can be independently scheduled, so that after receiving the UL grant, the UE reduces a delay for processing the UL grant (multiplexing data on different logical channels) by the UE.

A processing time of the eNB is reduced, and the UL grant is quickly delivered. For example, the eNB receives an SR at an n moment, and the UL grant can be fed back at an n+4 moment. For a high-priority SR, the UL grant can be delivered at an n+3 moment.

Note: In addition, for the UL grant (a format of the UL grant is shown in the following table) in the foregoing two manners, the eNB may allocate different uplink resource sizes, MCSs, uplink power, resource use attribute numerologies/TTI indications, and the like based on different SR types.

The resource use attribute (numerology) includes at least one of: a resource period (for example, the period is 1 ms, 2 ms, 5 ms, a length of one TTI, or a length of two TTIs), a length of a transmission time interval (TTI) (for example, a TTI of 1 ms, a TTI of 0.5 ms, a TTI length of two orthogonal frequency division multiplexing (OFDM) symbols, or a TTI length of one OFDM symbol), a subcarrier interval (for example, 15 KHz or 60 KHz), an encoding scheme (where for example, a Turbo code is used, or a low-density parity-check (LDPC) code is used, or a polar code is used), a multiple access manner (for example, OFDM or code division multiple access (CDMA)), a quantity of carriers occupied in frequency domain (for example, 12 subcarriers or 15 subcarriers), whether to perform frequency domain retransmission (where if the frequency domain retransmission is performed, a quantity of times of performing the frequency domain retransmission is further included), or whether to perform time domain retransmission (where if the time domain retransmission is performed, a quantity of times of performing the time domain retransmission is further included).

TABLE 2

Some IEs on a PDCCH in a UL grant

| Size (bit) | Purpose |
|---|---|
| 1 | Format Flag: Format 0 or 1A |
| 1 | Hopping Flag: Non-hopping or Hopping |
| $\left\lceil \log_2\left(\frac{N_{RB}^{UL}(N_{RB}^{UL}+1)}{2}\right)\right\rceil$ | -Hopping<br>$N_{UL,hop}$ bits: Hopping Location Information<br><br>$\left\lceil \log_2\left(\frac{N_{RB}^{UL}(N_{RB}^{UL}+1)}{2}\right)\right\rceil - N_{UL,hop}$<br><br>bits: Resource Assignment<br>-Non Hopping:<br><br>$\left\lceil \log_2\left(\frac{N_{RB}^{UL}(N_{RB}^{UL}+1)}{2}\right)\right\rceil$<br><br>bits: Resource Assignment |
| 5 | MCS |
| 3 | Numerology/TTI Indication |
| 1 | New Data Indicator |
| 2 | UL Power Control (PUSCH) |
| 3 | Cyclic Shift for DM RS |
| 2 | UL Index: TDD |

In one embodiment, for the eNB in a specific case, if a plurality of SRs of same UE are received, the base station processes the SRs in the following manners.

Case 1: Only one SR is replied to.

Case 2: Each SR is replied to, and the UE only needs to receive one SR and sends a BSR on an SR that is first received.

Option 1: The eNB replies to the plurality of SRs of the same UE with a same UL grant resource, and adds indication information to the UL grant. The UE can learn, according to the indication information, that the eNB allocates a same UL resource.

Option 2: The eNB replies to the plurality of SRs of the same UE with different UL grant resources.

Operation S205. The eNB notifies the UE of the first uplink resource.

Operation S206. The UE sends the BSR on the first uplink resource.

Operation S207. The eNB schedules a second uplink resource for the UE based on the received BSR, and notifies the UE of the second uplink resource.

In the foregoing two operations, the UE receives the UL grant, and sends uplink data by using the corresponding UL grant. The uplink data includes (BSRs that correspond to SRs of different types, or uplink data of an LCH/LCG that corresponds to the SRs of different types).

In one embodiment, UL grants that are applied for by the SRs of different types may be independently used or may be shared, that is, for example, a UL grant that is applied for by an SR of a low-priority type may be independently used by an LCH/LCG that corresponds to the SR, or may be pre-empted by an LCH/LCG corresponding to an SR of a high-priority type.

If a BSR is sent by using a first UL grant (on a first uplink resource), after the eNB receives the BSR, the eNB allocates a corresponding UL grant, where the UL grant can be used to send uplink data.

In the foregoing implementation process, it should be understood that:

(1) A multi-bit SR can carry a quantity of LCGs that has data available to be sent.

The UE sends an SR, and explicitly carries a type of the SR by using multi-bits. In one embodiment, the multi-bits may alternatively carry a quantity of LCGs that are of the UE and in which there is to-be-sent data, thereby assisting the eNB in allocating a UL grant of a proper size for the UE to send the BSR.

After receiving the UL grant, the UE uses the UL grant based on a logical channel priority LCP process, that is, determines how to multiplex a MAC PDU. The MAC PDU includes to-be-sent LCH data and a MAC CE (a BSR).

(2) When the UL grant is used, a sequence of the LCH data and the BSR can be configured.

In the foregoing LCP process, the UE determines, in a pre-stored priority sequence of the LCH data and the MAC CE, a sequence of multiplexing the MAC PDU. The priority sequence may be configured by the eNB, and a specific configuration manner may be RRC reconfiguration, MAC CE, or another.

A possible sequence of the LCH data and the BSR may be:

URLLC BSR>URLLC data>eMBB BSR>eMBB data; or
URLLC BSR>eMBB BSR>URLLC data>eMBB data,
and other sequences are not excluded.

(3) The BSR format may be a flexible format that uses an NR design, and includes two types: an odd-number quantity of LCGs and an even-number quantity of LCGs. FIG. 5a is a schematic diagram of a BSR format, and FIG. 5b is another schematic diagram of a BSR format. FIG. 5a shows NR BSR and Truncated NR BSR MAC control element for even N, that is, FIG. 5a is a schematic diagram of an NR BSR and a truncated NR BSR MAC CE when N is an even number. FIG. 5b shows NR BSR and Truncated NR BSR MAC control element for odd N, that is, FIG. 5b is a schematic diagram of an NR BSR and a truncated NR BSR MAC CE when N is an odd number.

Note: In the foregoing figures, LCG ID is an identifier of a logical channel, and an amount of to-be-sent data corresponding to an LCG can be represented by a buffer size.

(4) The BSR is sent (a truncated BSR is sent, and LCG IDs in the BSR are arranged in descending order).

When the UL grant is greater than a sum of a BSR that includes all LCGs in which to-be-sent data packets exist and subheaders that correspond to the BSR, the BSR that corresponds to all the LCGs in which to-be-sent data exists, that is, a complete BSR may be reported to the base station; or, if the UL grant is insufficient, a truncated BSR is reported, and buffer sizes of LCGs in which to-be-sent data exists are reported as much as possible, and the LCGs are arranged based on a highest LCH priority in the LCG group (the reported LCG IDs in the BSR are arranged in descending order).

Specially, different from an existing fixed BSR format (where there are only two types of BSRs: a short BSR and a long BSR, respectively corresponding to one LCG and four LCGs) in LTE, the NR BSR format is more flexible, and only a buffer size of an LCG in which to-be-sent data exists is reported.

Operation S208. The UE sends the data to the eNB on the second uplink resource.

When there is a remaining second uplink resource, the remaining resource may be used to send a padding BSR; and if a quantity of remaining bits is greater than a sum of a BSR that includes all LCGs in which to-be-sent data packets exist and subheaders subheaders that correspond to the BSR, the BSR that corresponds to all the LCGs in which the to-be-sent data exists may be reported to the base station;

otherwise, a truncated BSR is reported, and a BSR that includes LCGs in which to-be-sent data exists is reported as much as possible, and the LCGs are arranged based on a highest LCH priority in the LCG group (the reported LCG IDs in the BSR are arranged in descending order).

In the foregoing embodiment, the to-be-sent data in the BSR includes data in a radio link control (RLC) layer entity and a packet data convergence Protocol (PDCP) layer entity, but does not include an RLC header and a PDCP header. The RLC layer is located above a MAC layer, and a PDCP layer is located above the RLC layer.

Specially, a new layer (for example, SDAP: Service Data Adaptation Protocol) above the PDCP layer is introduced to 5G, and is used for mapping between a QoS flow and a data radio bearer DRB. In one embodiment, when calculating an amount of to-be-reported data in the BSR, an amount of to-be-sent data at the new layer may be considered, but a header of a protocol data unit PDU at the new layer is not considered.

In the foregoing embodiment, the UE distinguishes between types of pending SRs. By distinguishing between the types of the SRs, after identifying the different types of the SRs, the UE may use different processing manners, for example, quickly trigger/send an SR; and configure different SR-related parameters—sr-prohibitTimer and logicalChannelSR-ProhibitTimer. In addition, the UE may notify the eNB of information about the SR type in an explicit or implicit manner, thereby assisting the eNB in implementing scheduling by distinguishing between types. In this manner, for a high-priority SR that is triggered because data needs to be sent on the LCH, the UE can quickly instruct the physical layer to signal the SR, and add the priority information in an explicit or implicit manner in the SR sending process, to assist the eNB in quickly scheduling a downlink resource, to reduce a scheduling delay, so that the base station can properly allocate resources Based on the foregoing instances, that the eNB and the UE are respectively the access network device and the terminal device is used as an example, to describe again how to cancel the different types of pending SRs in Embodiment 2.

When the spending SR meets any one of the following cases, the spending SR is canceled:

Option 1: All triggered BSRs are canceled when a BSR is included in a MAC PDU for transmission, and a corresponding BSR is carried in the PDU packet.

Option 2: A grant-free resource is configured at an upper layer—the SR may be canceled, and the foregoing two operations are not needed.

Option 3: Sufficient UL grants are allocated to be used to send data.

Option 4: For different types of pending SRs, the pending SR of the type is canceled only when a UL grant that is applied for by a corresponding type of SR is received.

The option 2 and option 4 are newly-added cases compared with the LTE. The grant-free manner in the option 2 is equivalent to pre-configuring a resource for the UE. When the UE has the resource, provided that there is a to-be-sent data packet, the UE can directly send the data packet without applying for a UL grant in a scheduling mode.

With rapid development of 5G technologies, there are many types of 5G services, and different services have different requirements. The method for scheduling an uplink transmission resource provided in this embodiment of the present disclosure proposes to distinguish between different SR types, for example, priorities. For a high-priority SR, the physical layer can be instructed to signal an SR, and the priority information is added to the eNB explicitly or implicitly in the SR sending process, to assist the eNB in distinguishing between different service scheduling requirements; a UL grant is quickly and properly allocated, and the UE can cancel sending of the scheduling request when a specific case is met, to further save a resource.

Figure 6:
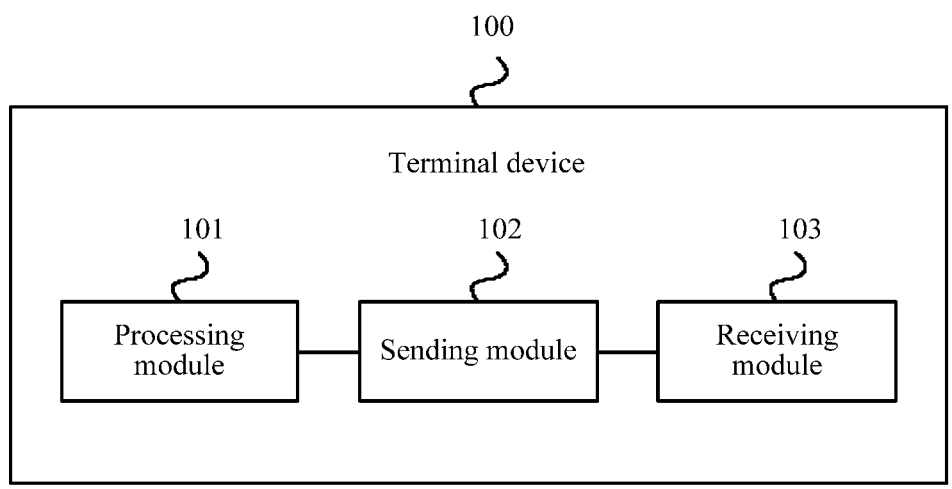
FIG. 6 is a schematic structural diagram of Embodiment 1 of a terminal device according to an embodiment of the present disclosure.

FIG. 6 is a schematic structural diagram of Embodiment 1 of a terminal device according to an embodiment of the present disclosure. As shown in FIG. 6, the terminal device 100 includes:

a processing module 101, configured to determine a first scheduling request according to pre-obtained first indication information when a first BSR is triggered because to-be-sent data exists on a first logical channel of a terminal device, where the first indication information is used to indicate a correspondence between a logical channel and a type of a scheduling request, and the first scheduling request includes a type that is of the first scheduling request and that is used to indicate uplink scheduling information required by the terminal device;

a sending module 102, configured to send the first scheduling request to an access network device; and a receiving module 103, configured to receive first uplink scheduling information sent by the access network device, where the uplink scheduling information is used to indicate a first uplink resource used by the terminal device to send uplink data to the access network device.

The terminal device provided in this embodiment is configured to perform the technical solutions on a terminal device side in any one of the foregoing embodiments. When the first BSR is triggered because the to-be-sent data exists on the first logical channel of the terminal device, the processing module determines the first scheduling request according to the pre-obtained first indication information, and sends the first scheduling request that carries the type information to the access network device. The access network device allocates the uplink resource to the terminal device based on the type of the scheduling request, and notifies the terminal device of the uplink resource. The processing module adds the type of the scheduling request to the scheduling request based on the correspondence between a logical channel and a type when sending the scheduling request to the access network device. The access network device may distinguish between scheduling requests of a service based on the types of the scheduling requests, to quickly and properly schedule a resource for the terminal device.

In Embodiment 2 of the terminal device, the sending module 102 is further configured to send the uplink data on the first uplink resource, where the uplink data includes the first BSR or the first BSR and the to-be-sent data.

In one embodiment, the receiving module 103 is further configured to receive second uplink scheduling information sent by the access network device, where the second uplink scheduling information is used to indicate a second uplink resource that is configured for the terminal device by the access network device based on the first BSR and that is used to send buffered to-be-sent data to the access network device; and the sending module 102 is further configured to send the to-be-sent data on the second uplink resource.

In one embodiment, the receiving module 103 is further configured to receive the first indication information sent by the access network device.

In one embodiment, the first indication information further includes:

a correspondence between a logical channel and a type of a scheduling request; or a correspondence between a logical channel and a resource use attribute, and a correspondence between a resource use attribute and a type of a scheduling request; or a correspondence between a type of a scheduling request and a service group, and a correspondence between a logical channel and a service priority; or a correspondence between a type of a scheduling request and a priority of a logical channel.

In one embodiment, the sending module 102 is specifically configured to:

send the first scheduling request to the access network device on a PUCCH corresponding to the type of the first scheduling request; or send the first scheduling request to the access network device on an available PUCCH.

In one embodiment, the first logical channel is configured to send high-priority service data.

In one embodiment, a duration of a scheduling request prohibit timer of the first logical channel is less than a duration of a scheduling request prohibit timer of another logical channel.

In one embodiment, in response to a determination that the first BSR is triggered because the to-be-sent data exists on the first logical channel, a scheduling request prohibit timer corresponding to the terminal device is disabled.

In one embodiment, the processing module 101 is further configured to cancel the first scheduling request when detecting that a scheduling request canceling case is met, where the scheduling request canceling case includes any one of the following cases:

the first BSR is carried in a to-be-sent MAC PDU;

uplink resources that have been allocated by the access network device to the terminal device are sufficient for transmitting all to-be-sent data;

the terminal device has received an uplink resource that is allocated by the access network device and that corresponds to the type of the first scheduling request; and the access network device configures a grant-free uplink resource for the terminal device.

The terminal device provided in any one of the foregoing embodiments is configured to perform the technical solutions of the terminal device in any one of the foregoing embodiments. Their implementation principles and technical effects are similar, and details are not described herein again.

Figure 7:
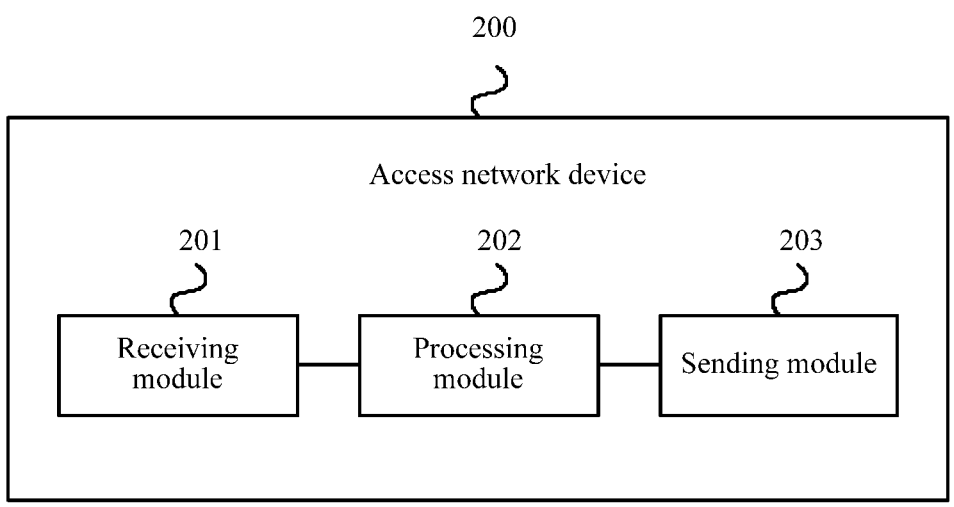
FIG. 7 is a schematic structural diagram of Embodiment 1 of an access network device according to an embodiment of the present disclosure.

FIG. 7 is a schematic structural diagram of Embodiment 1 of an access network device according to an embodiment of the present disclosure. As shown in FIG. 7, the access network device 200 includes:

a receiving module 201, configured to receive a first scheduling request sent by a terminal device, where the first scheduling request includes a type that is of the first scheduling request and that is used to indicate uplink scheduling information required by the terminal device;

a processing module 202, configured to: determine the type of the first scheduling request; and schedule, for the terminal device based on the type of the first scheduling request, a first uplink resource that is used to send uplink data; and a sending module 203, configured to send first uplink scheduling information to the terminal device, where the first uplink scheduling information is used to indicate the first uplink resource.

The access network device provided in this embodiment is configured to implement the technical solutions on an access network device side in any one of the foregoing embodiments. The scheduling request received by the receiving module carries a type of the scheduling request. The processing module may determine the type of the scheduling request based on a channel of the scheduling request or a quantity of the scheduling request or information carried in the scheduling request, and then distinguish between scheduling requests of a service based on types of the scheduling requests, to quickly and properly schedule a resource for the terminal device.

In one embodiment, the receiving module 201 is further configured to receive the uplink data sent by the terminal device on the first uplink resource, where the uplink data includes the first BSR or the first BSR and data.

In one embodiment, the processing module 202 is further configured to schedule, for the terminal device based on the first BSR, a second uplink resource that is used to upload the data;

the sending module 203 is further configured to send second uplink scheduling information to the terminal device, where the second uplink scheduling information is used to indicate the second uplink resource; and the receiving module 201 is further configured to receive, on the second uplink resource, the data sent by the terminal device.

In one embodiment, the sending module 203 is further configured to send first indication information to the terminal device, where the first indication information is used to indicate a correspondence between a logical channel and a type of a scheduling request.

In one embodiment, the first indication information includes:

the correspondence between a logical channel and a type of the scheduling request; or a correspondence between a logical channel and a resource use attribute, and a correspondence between a resource use attribute and a type of the scheduling request; or a correspondence between a type of the scheduling request and a service group, and a correspondence between a logical channel and a service priority; or a correspondence between a type of the scheduling request and a priority of the logical channel.

In one embodiment, the processing module 202 is specifically configured to:

determine the type of the first scheduling request based on a physical uplink control channel (PUCCH) on which the first scheduling request is received and a pre-configured correspondence between a type of a scheduling request and a PUCCH; or determine the type of the first scheduling request based on a quantity of first scheduling requests received in a preset duration.

The access network device provided in any one of the foregoing embodiments is configured to perform the technical solutions of the access network device in any one of the foregoing embodiments. Their implementation principles and technical effects are similar, and details are not described herein again.

It should be understood that, during specific implementation of the foregoing terminal device and access network device, the processing module may be specifically implemented as a processor, the sending module may be implemented as a transmitter, and the receiving module may be implemented as a receiver.

A fifth aspect of the embodiments of the present disclosure provides a terminal device, including: a memory, a processor, a transmitter, a receiver, and a computer program. The computer program is stored in the memory, and the processor runs the computer program to perform the method for scheduling an uplink transmission resource according to any embodiment.

During specific implementation of the foregoing terminal device, there is at least one processor, configured to execute an execution instruction, namely, the computer program stored in the memory, so that a sending device performs data exchange with the access network device by using a communications interface, to perform the method for scheduling an uplink transmission resource according to the foregoing various implementations. In one embodiment, the memory may further be integrated into the processor.

A sixth aspect of the embodiments of the present disclosure provides an access network device, including: a memory, a processor, a receiver, a transmitter, and a computer program. The computer program is stored in the memory, and the processor runs the computer program to perform the method for scheduling an uplink transmission resource according to any one of the foregoing embodiments.

During specific implementation of the foregoing access network device, there is at least one processor, configured to execute an execution instruction, namely, the computer program stored in the memory, so that the access network device performs data exchange with the terminal device by using a communications interface, to perform the method for scheduling an uplink transmission resource according to the foregoing various implementations. In one embodiment, the memory may further be integrated into the processor.

A seventh aspect of the embodiments of the present disclosure provides a storage medium, including a readable storage medium and a computer program. The computer program is configured to implement the solutions on a terminal device side in the method for scheduling an uplink transmission resource according to any embodiment of the first aspect.

An eighth aspect of the embodiments of the present disclosure provides a storage medium, including a readable storage medium and a computer program. The computer program is configured to implement the solutions on an access network device side in the method for scheduling an uplink transmission resource according to any embodiment.

A ninth aspect of the embodiments of the present disclosure provides a program product. The program product includes a computer program (namely, an execution instruction), and the computer program is stored in a readable storage medium. At least one processor of a terminal device may read the computer program from the readable storage medium, and the at least one processor executes the computer program, so that the terminal device implements the method for scheduling an uplink transmission resource according to the foregoing various implementations.

An embodiment of the present disclosure further provides a program product. The program product includes a computer program (namely, an execution instruction), and the computer program is stored in a readable storage medium. At least one processor of an access network device may read the computer program from the readable storage medium, and the at least one processor executes the computer program, so that the access network device implements the method for scheduling an uplink transmission resource according to the foregoing various implementations.

In the foregoing implementation of the terminal device or the access network device, it should be understood that the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. The operations of the method disclosed with reference to the embodiments of the present disclosure may be directly performed by a hardware processor, or may be performed by using a combination of hardware in the processor and a software module.

All or some of the operations of the method embodiments may be implemented by a program instructing related hardware. The foregoing program may be stored in a computer-readable memory. When the program is executed, the operations of the methods in the foregoing embodiments are performed. The foregoing memory (storage medium) includes: a read-only memory (ROM), a RAM, a flash memory, a hard disk, a solid state disk, a magnetic tape, a floppy disk, an optical disc, and any combination thereof

What is claimed is:

1. A method for scheduling an uplink transmission resource, wherein the method comprises:
    determining a first scheduling request according to pre-obtained first indication information when a first buffer status report (BSR) is triggered because to-be-sent data exists on a first logical channel of a terminal device, wherein the first indication information is used to indicate a correspondence between a logical channel and a type of a scheduling request, and the first scheduling request comprises a type that is of the first scheduling request and that is used to indicate uplink scheduling information required by the terminal device;
    determining the type of the first scheduling request based on a quantity of scheduling requests received in a preset duration associated with service priorities, wherein frequencies at which scheduling requests that are of different service priorities that can be sent are different;

sending the first scheduling request to an access network device based on the type of the first scheduling request, wherein the type of the first scheduling request is determined based on service priorities, the quantity of scheduling requests associated with the service priorities received in the preset duration, a physical uplink control channel (PUCCH) on which the first scheduling request is received and a pre-configured correspondence between the type of the first scheduling request and the PUCCH;

receiving first uplink scheduling information from the access network device, wherein the uplink scheduling information is used to indicate a first uplink resource used by the terminal device to send uplink data to the access network device;

sending the uplink data on the first uplink resource; and receiving second uplink scheduling information from the access network device, wherein the second uplink scheduling information is used to indicate a second uplink resource that is configured for the terminal device by the access network device based on the first BSR and that is used to send buffered to-be-sent data to the access network device.

2. The method according to claim 1, wherein the uplink data comprises the first BSR or the first BSR and the to-be-sent data.

3. The method according to claim 2, wherein the method further comprises:

sending the to-be-sent data on the second uplink resource.

4. The method according to claim 1, wherein before the determining a first scheduling request according to pre-obtained first indication information when a first buffer status report (BSR) is triggered because to-be-sent data exists on a first logical channel of a terminal device, the method further comprises:

receiving the first indication information from the access network device.

5. The method according to claim 1, wherein the sending the first scheduling request to an access network device comprises:

instructing a physical layer to send the first scheduling request to the access network device on an available PUCCH.

6. The method according to claim 1, wherein before the sending the first scheduling request to an access network device, the method further comprises:

canceling the first scheduling request when detecting that a scheduling request canceling case is met, wherein the scheduling request canceling case comprises any one of the following cases:

the first BSR is carried in a to-be-sent media access control protocol data unit (MAC PDU);

uplink resources that have been allocated by the access network device to the terminal device are sufficient for transmitting all to-be-sent data;

the terminal device has received an uplink resource that is allocated by the access network device and that corresponds to the type of the first scheduling request; and the access network device configures a grant-free uplink resource for the terminal device.

7. An apparatus for scheduling an uplink transmission resource, wherein the apparatus comprises:

a storage medium including executable instructions; and a processor;

wherein the executable instructions, when executed by the processor, cause the apparatus to:

determine a first scheduling request according to pre-obtained first indication information when a first buffer status report (BSR) is triggered because to-be-sent data exists on a first logical channel of a terminal device, wherein the first indication information is used to indicate a correspondence between a logical channel and a type of a scheduling request, and the first scheduling request comprises a type that is of the first scheduling request and that is used to indicate uplink scheduling information required by the terminal device;

determining the type of the first scheduling request based on a quantity of scheduling requests received in a preset duration associated with service priorities, wherein frequencies at which scheduling requests that are of different service priorities that can be sent are different;

send the first scheduling request to an access network device based on the type of the first scheduling request, wherein the type of the first scheduling request is determined based on service priorities, the quantity of scheduling requests associated with the service priorities received in the preset duration, a physical uplink control channel (PUCCH) on which the first scheduling request is received and a pre-configured correspondence between the type of the first scheduling request and the PUCCH;

receive first uplink scheduling information from the access network device, wherein the uplink scheduling information is used to indicate a first uplink resource used by the terminal device to send uplink data to the access network device;

send the uplink data on the first uplink resource; and receive second uplink scheduling information from the access network device, and the second uplink scheduling information is used to indicate a second uplink resource that is configured for the terminal device by the access network device based on the first BSR and that is used to send buffered to-be-sent data to the access network device.

8. The apparatus according to claim 7, wherein the uplink data comprises the first BSR or the first BSR and the to-be-sent data.

9. The apparatus according to claim 8, wherein the executable instructions, when executed by the processor, further cause the apparatus to:

send the to-be-sent data on the second uplink resource.

10. The apparatus according to claim 7, wherein the executable instructions, when executed by the processor, further cause the apparatus to:

receive the first indication information from the access network device.

11. The apparatus according to claim 7, wherein the first indication information further comprises:

the correspondence between a logical channel and a type of the scheduling request; or a correspondence between a logical channel and a resource use attribute, and a correspondence between a resource use attribute and a type of the scheduling request; or a correspondence between a type of the scheduling request and a service group, and a correspondence between a logical channel and a service priority; or a correspondence between a type of the scheduling request and a priority of the logical channel.

12. The apparatus according to claim 7, wherein the executable instructions, when executed by the processor, further cause the apparatus to:

send the first scheduling request to the access network device on an available PUCCH.

13. The apparatus according to claim 7, wherein the first logical channel is used to send high-priority service data.

14. The apparatus according to claim 7, wherein the executable instructions, when executed by the processor, further cause the apparatus to:
cancel the first scheduling request when detecting that a scheduling request canceling case is met, wherein the scheduling request canceling case comprises any one of the following cases:
the first BSR is carried in a to-be-sent media access control protocol data unit (MAC PDU);
uplink resources that have been allocated by the access network device to the terminal device are sufficient for transmitting all to-be-sent data;
the terminal device has received an uplink resource that is allocated by the access network device and that corresponds to the type of the first scheduling request; and
the access network device configures a grant-free uplink resource for the terminal device.

15. An apparatus for scheduling an uplink transmission resource, wherein the apparatus comprises:
a storage medium including executable instructions; and
a processor;
wherein the executable instructions, when executed by the processor, cause the apparatus to:
receive a first scheduling request from a terminal device, wherein the first scheduling request comprises a type that is of the first scheduling request and that is used to indicate uplink scheduling information required by the terminal device;
determine the type of the first scheduling request based on a quantity of scheduling requests received in a preset duration associated with service priorities; and schedule, for the terminal device based on the type of the first scheduling request, a first uplink resource that is used to send uplink data, wherein frequencies at which scheduling requests that are of different service priorities that can be sent are different;
send first uplink scheduling information to the terminal device based on the type of the first scheduling request, wherein the type of the first scheduling request is determined based on service priorities, the quantity of scheduling requests associated with the service priorities received in the preset duration, a physical uplink control channel (PUCCH) on which the first scheduling request is received and a pre-configured correspondence between the type of the first scheduling request and the PUCCH, wherein the first uplink scheduling information is used to indicate the first uplink resource;
receive the uplink data from the terminal device on the first uplink resource;
schedule, for the terminal device based on the first BSR, a second uplink resource that is used to upload the uplink data; and
send second uplink scheduling information to the terminal device, wherein the second uplink scheduling information is used to indicate the second uplink resource.

16. The apparatus according to claim 15, wherein the uplink data comprises a first buffer status report (BSR) or the first BSR and data.

17. The apparatus according to claim 16, wherein the executable instructions, when executed by the processor, further cause the apparatus to:
receive, on the second uplink resource, the data from the terminal device.

18. The apparatus according to claim 15, wherein the executable instructions, when executed by the processor, further cause the apparatus to:
send first indication information to the terminal device, wherein the first indication information is used to indicate a correspondence between a logical channel and a type of a scheduling request.

19. The apparatus according to claim 18, wherein the first indication information comprises:
the correspondence between a logical channel and a type of the scheduling request; or
a correspondence between a logical channel and a resource use attribute, and a correspondence between a resource use attribute and a type of the scheduling request; or
a correspondence between a type of the scheduling request and a service group, and a correspondence between a logical channel and a service priority; or
a correspondence between a type of the scheduling request and a priority of the logical channel.

20. The apparatus according to claim 15, wherein the executable instructions, when executed by the processor, further cause the apparatus to:
determine the type of the first scheduling request based on a quantity of first scheduling requests received in a preset duration.

* * * * *